(12) United States Patent
Sierens

(10) Patent No.: US 9,341,698 B1
(45) Date of Patent: May 17, 2016

(54) RADIO FREQUENCY JAMMING SOURCE LOCATOR

(71) Applicant: Exelis Inc., McLean, VA (US)

(72) Inventor: Randell S. Sierens, Webster, NY (US)

(73) Assignee: Exelis Inc., McLean, VA (US)

( * ) Notice: Subject to any disclaimer, the term of this patent is extended or adjusted under 35 U.S.C. 154(b) by 552 days.

(21) Appl. No.: 13/740,787

(22) Filed: Jan. 14, 2013

(51) Int. Cl.
*G01S 5/04* (2006.01)
*G01S 3/38* (2006.01)

(52) U.S. Cl.
CPC .......................................... *G01S 3/38* (2013.01)

(58) Field of Classification Search
CPC ................. G01S 5/04; G01S 3/38; G01S 3/02
USPC .................................................. 342/443, 451
See application file for complete search history.

(56) References Cited

U.S. PATENT DOCUMENTS

| | | | | |
|---|---|---|---|---|
| 5,818,389 | A * | 10/1998 | Lazar | 342/383 |
| 2004/0203461 | A1 | 10/2004 | Hay | |
| 2006/0023655 | A1 | 2/2006 | Engel et al. | |
| 2007/0268174 | A1* | 11/2007 | Ham et al. | 342/17 |

OTHER PUBLICATIONS

A. K. Brown et al., "Android Application for GPS Interference Detection," ION GNSS 2011, Session C3: Interference and Spectrum Management, Sep. 19-23, 2011, Portland, Oregon.
Datasheet, GPS World from Chronos Technology, CTL-3500, GPS L1 Interference Monitor, GPS Solutions from Chronos, CTLds083 v2.1, Feb. 2011.
A. Brown et al., "Jammer and Interference Location System—Design and Initial Test Results," Proceedings of the ION GPS '99, Sep. 1999, Nashville, Tennessee.

* cited by examiner

*Primary Examiner* — Harry Liu
(74) *Attorney, Agent, or Firm* — Edell, Shapiro & Finnan LLC

(57) ABSTRACT

A radio interference locator includes a detector circuit having a directional antenna defining a boresight along which electromagnetic radiation is preferentially accepted. The antenna is coupled to a signal detector which generates an electrical signal from a selected radio-frequency (RF) spectral band of the electromagnetic radiation accepted by the antenna. A processor determines the boresight direction at prescribed sample times as well as an associated signal characteristic, such as a signal level of the electrical signal, measured at the sample times. Data are presented that indicate the signal characteristic for the associated boresight direction at each of the sample times. A mobile platform connects the detector circuit and the processor so that they can be freely oriented in space in fixed mechanical formation by a single human operator.

22 Claims, 8 Drawing Sheets

RADIO FREQUENCY JAMMING SOURCE LOCATOR

BACKGROUND

Jamming circuits, or jammers, are devices that generate electromagnetic radiation for the purpose of deliberately disrupting the successful conveyance of information on a communication link. Jamming transmitters can be configured to transmit on frequencies allocated to specific systems with the intended goal of disrupting information services of that system. The Global Positioning System (GPS) is one such system.

GPS tracking has become ubiquitous; it is an efficient means by which up-to-date whereabouts are maintained for, among many other things, vehicles, equipment, and house-arrest prisoners. GPS tracking capability is now incorporated in many devices as standard equipment, the most notable example of such is various models of cellular phones. Indeed, tracking the location of a child's cellular phone has become popular with many parents. This omnipresence of GPS tracking is considered by some to be invasive and jammers have become a popular mechanism by which concerned people can maintain a sense of privacy. However, jammers, by definition, operate in a frequency spectrum for which they are not lawfully authorized and are illegal for at least that reason in many countries including the United States.

GPS jammers are used to more sinister ends as well, such as to hide from justice or to subvert the recovery of stolen property. GPS jammers are used in military domains as well, including on the battlefield where a lost location fix can be life-threatening.

In light of the foregoing discussion, the desirability of highly portable jamming source locators is apparent.

SUMMARY

Described herein is a technique applicable to detection and location of service denial of an information service, i.e., a source of data that is carried over an electromagnetic carrier signal.

A radio frequency jamming locator includes a detector circuit having a directional antenna defining a boresight along which electromagnetic radiation is preferentially accepted. The antenna is coupled to a signal detector which generates an electrical signal from a selected radio-frequency (RF) spectral band of the electromagnetic radiation accepted by the antenna. A processor determines the boresight direction at prescribed sample times as well as an associated signal characteristic, such as a signal level of the electrical signal, measured at the sample times. Data are presented that indicate the signal characteristic for the associated boresight direction at each of the sample times. A mobile platform connects the detector circuit and the processor so that they can be freely oriented in space in fixed mechanical formation by a single human operator.

DETAILED DESCRIPTION

Figure 1:
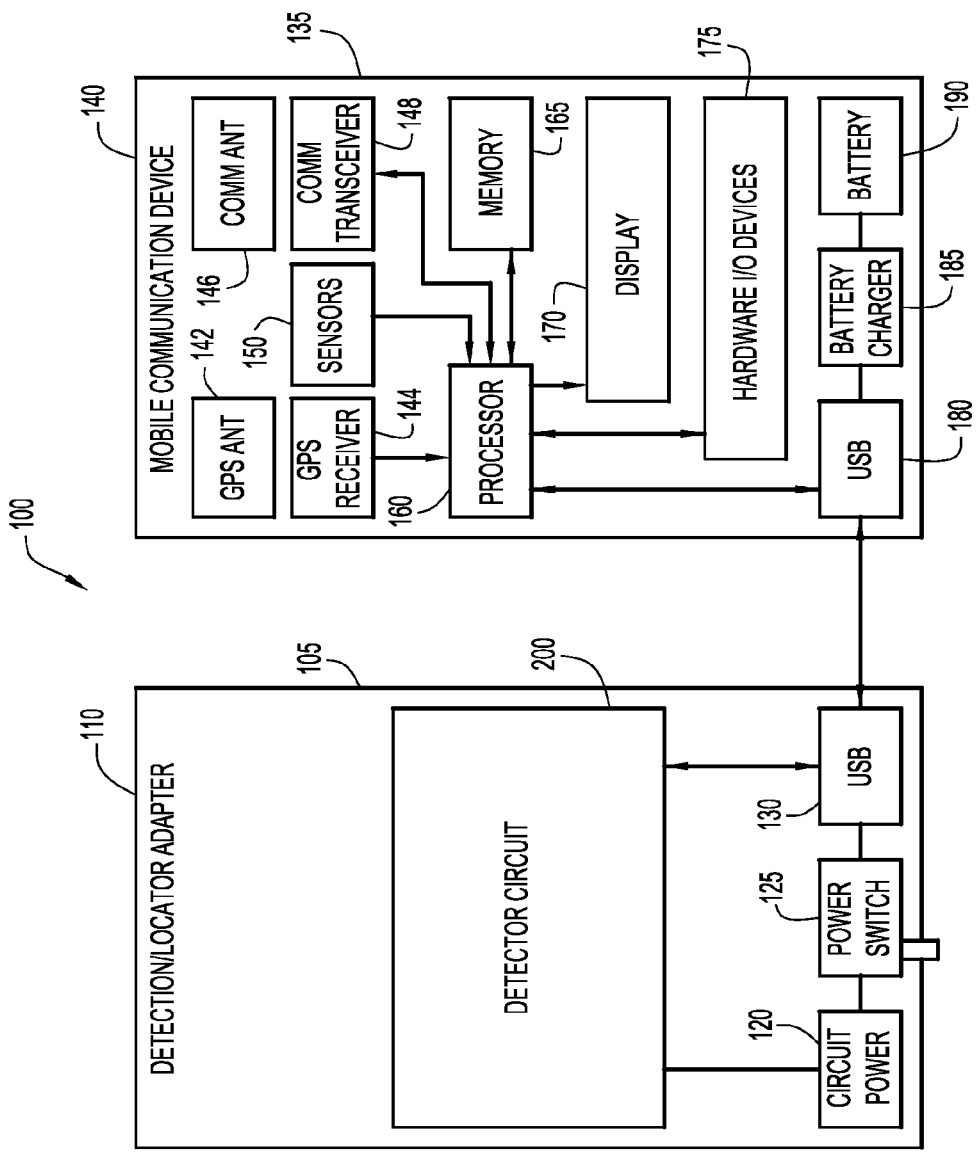
FIG. 1 is a block diagram of example system components by which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The techniques described herein are directed to detecting and locating a radio frequency source that transmits on an unauthorized frequency, such as to interfere with the flow of data carried in information-bearing signals of an information service. The exemplary embodiments described herein are directed to global navigation satellite systems (GNSS), such as the global navigation system (GPS) used in the United States, although the present invention is not so limited. Upon review of this disclosure and appreciation of the concepts disclosed herein, the ordinarily skilled artisan will recognize other signals and/or information services to which the present inventive concept can be applied. The scope of the present invention is intended to encompass all such alternative implementations.

A GPS jammer behaves as a point-source radiator at reasonable distances and, as such, can be located by radio direction finding. In basic embodiments, the present invention implements hand-held radio direction finding at GPS carrier frequencies, although the technique can be adapted to other frequencies as well. A small form factor, low-profile directional antenna and signal detection circuitry can be mechanically and electrically coupled to a mobile computer executing software that displays signal characteristics, such as signal strength, in the direction of maximum gain of the antenna. The antenna alignment is fixed with respect to the mobile computer and the two move together as a single unit. To locate a jamming source, an operator rotates the assembly to direct the antenna and monitors the signal levels in the display. The maximum displayed signal level value occurs when the antenna as aligned with the point-source radiator, i.e., the GPS jammer. However, it is to be understood that the present invention is not limited to the foregoing, as the ordinarily skilled artisan will recognized upon review of this disclosure.

FIG. 1 is a block diagram of an exemplary jammer locator system (JLS) 100 by which the present invention may be embodied. JLS 100 can be viewed as comprising two primary subsystems: a detection and locator adapter 110, referred to herein simply as adapter 110, and a mobile communication device 140. The two subsystems may be communicatively coupled by a suitable signaling bus, such as the standard Universal Serial Bus (USB), although the present invention is not so limited. In certain embodiments, the subsystems 110 and 140 are contained in separate and distinct housings, representatively illustrated at housings 105 and 135, respectively. However, the invention may also be embodied in a single housing.

Figure 2:
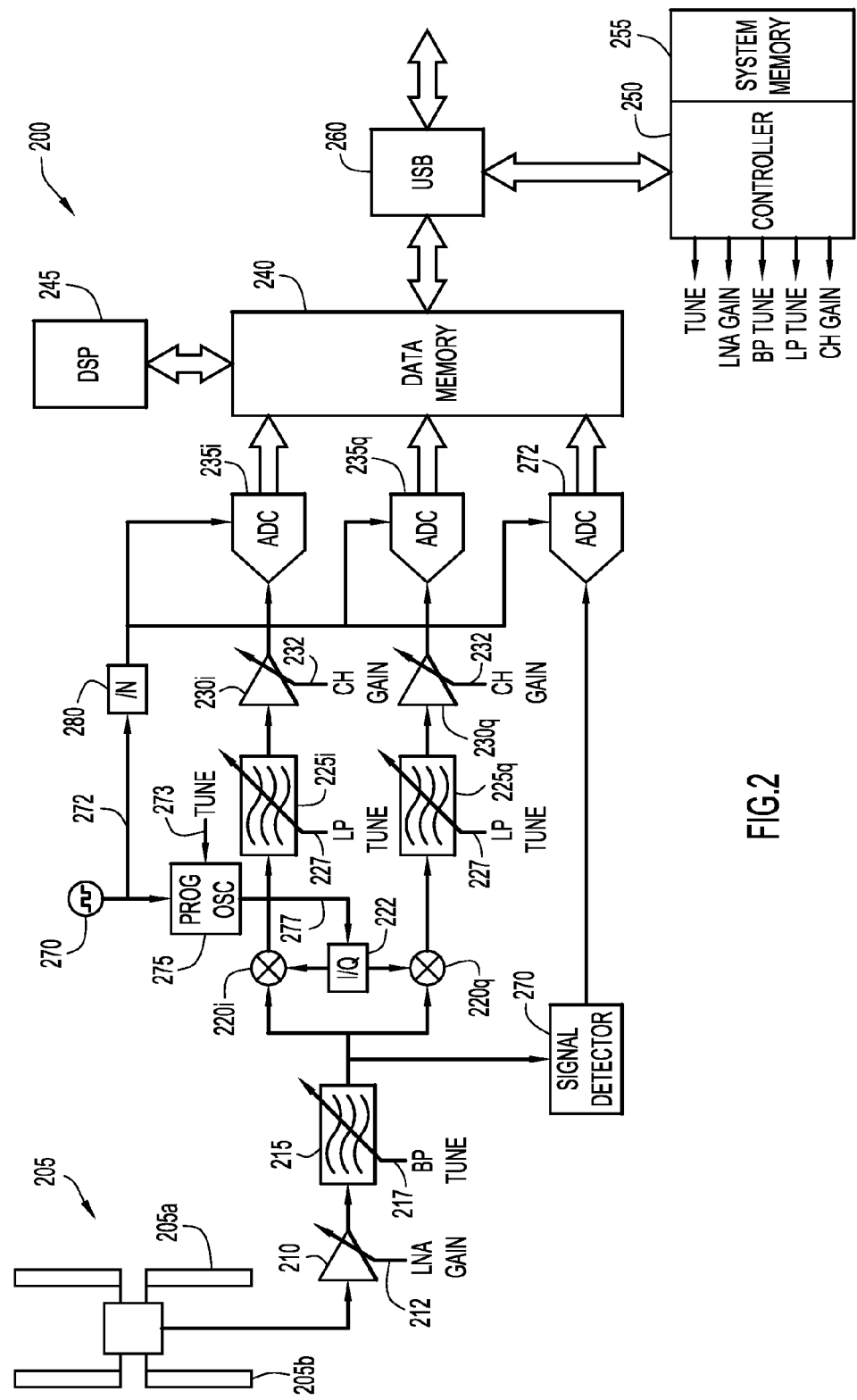
FIG. 2 is a schematic block diagram of a jammer detector circuit that may be used in conjunction with the present general inventive concept.

An exemplary adapter 110 may include a detector circuit 200, an example of which is illustrated in FIG. 2 and described in detail below. Additionally, adapter 110 may include a USB transceiver 130 through which detector data and control commands/data are conveyed. Power for detector circuit 200 may be derived from USB transceiver 130, which is itself derived from battery 190 in mobile communication device 140, by way of a suitable circuit power circuit 120. A power switch 125 may be provided to remove power from detector circuit 200 and conserve battery power when jamming detection is not being performed.

Mobile communication device 140 is illustrated in a generic abstraction that represents features in many common mobile computing platform chipsets and peripherals. The ordinarily skilled artisan will appreciate that features other than those described herein may be implemented depending on the actual platform being used to embody the invention. The scope of the present invention is intended to encompass such variations, modifications and improvements. In the present embodiment, mobile communication device 140 is configured as a smartphone, as the term is conventionally known in the art, and will be referred to herein simply as smartphone 140.

Smartphone 140 includes network communication antenna 146 and transceiver 148 to implement network communications. The present invention is not limited to a particular communication standard and antenna 146/transceiver 148 may be configured to support a wide range of communication standards, such as, for example, Global System for Mobile Communications (GSM), General Packet Radio Services (GPRS), Enhanced Data rates for GSM Evolution (EDGE), Code Division Multiple Access (CDMA), Universal Mobile Telecommunications System/Wideband Code Division Multiple Access (UMTS/WCDMA) standards.

Smartphone 140 may additionally include GPS antenna 142 and GPS receiver circuit 144 that demodulate and decode GPS satellite signals for fixing a geographical location of JLS 100. The present invention is not limited to a particular GPS implementation. GPS antenna 142 and GPS receiver 144 may be configured to receive and demodulate GPS signals on, for example, the L1 carrier (1.57542 GHz; modulated by both course acquisition (C/A) and precise (P) codes), the L2 carrier (1.2276 GHz, modulated only by the P code), and others.

Smartphone 140 may include a variety of sensors, generally illustrated at sensors 150, to include gyroscopes, accelerometers, cameras, compasses, proximity sensors, humidity sensors, pressure sensors, magnetometers and temperature sensors. Any and all such sensors can be used in embodiments of the present invention to provide primary or supplementary data in determining position and orientation in space of JLS 100, as well as environmental conditions in proximity to JLS 100.

Processor 160 may be a single-chip applications processor that supports the pertinent cellular standards and complements the pertinent modem, chipset and air interface. Processor 160 may be of suitable architecture to sustain multiple processes, including by parallel execution, to run various applications and to operate multiple functions simultaneously without quality of service compromises. Processor 160 may integrate several elements, such as a low-power reduced instruction set computing (RISC) processor, a digital signal processor (DSP), a 2D/3D graphics accelerator, imaging and video accelerators, high-performance system interconnects and industry-standard peripherals.

Memory 165 may be a combination of volatile and non-volatile integrated circuit memory circuits for storing data and program code, i.e., processor instructions that, when executed by processor 160, configures processor 160 to perform various functions, such as those described with reference to FIG. 3. Memory 165 can include both fixed on-board memory and removable memory. Accordingly, memory 165 can be made to have sufficiently capacity for large amounts of data, such as data log files described below.

A user interface may be implemented through display 170 and hardware input/output (I/O) devices 175. Display 170 may be any suitable graphics device and may include touchscreen capabilities by which various interactive controls may be implemented on the surface of display 170. Hardware I/O devices 175 general include one or more microphones and one or more speakers, and may include buttons, switches, potentiometers to control system functions, and connectors for connecting peripherals.

Power is provided to smartphone 140 by way of a battery 190, which may be recharged by battery charger 185. Battery charger 185 may operate from power derived from USB transceiver 180, as illustrated, or may connected to a separate connector on smartphone 140.

In certain embodiments, JLS 100 leverages hardware and software resources available in typical smartphones. As such, with suitable software executing on a smartphone to support an attached adapter 110, a fully functional jammer locator system may be realized. Adapter 110 may be made generic; that is, the same adapter 110 may be attached to different smartphone platforms without modification. The jammer locator system 100 may be completed by application software configured to execute on that particular platform.

FIG. 2 illustrates an exemplary detector circuit 200. At the input of detector circuit 200 resides a directional antenna 205, which produces a maximum electrical output when the impinging electromagnetic radiation arrives in alignment with the antenna's axis of maximum gain, referred to herein as the antenna's boresight. It certain embodiments, antenna 205 is constructed from multiple antenna elements, representatively illustrated at antenna elements 205a, 205b, suitably arranged to achieve a desired directivity. Maximum received power is thus obtained by aligning the boresight of antenna 205 normally to the wavefronts emitted from the jamming transmitter. The ordinarily skilled artisan will recognize this as an underlying principle of one technique of radio direction finding.

The signal chain following antenna 205 may implement a tunable RF front-end comprising a programmable low noise amplifier (LNA) 210, programmable RF filter 215, and one or more signal detectors. That is, the present invention is not limited to particular detection or analysis methodologies so that a balance can be reached between on-board detection and analysis capabilities and various design costs that include power consumption, size and weight, price, etc. The following examples are intended to illustrate possibilities, but should not be considered the only possibilities.

In one embodiment, a signal detector is an RF downconverter comprising mixers 220$i$, 220$q$, programmable channel filters 225$i$, 225$q$, channel amplifiers 230$i$, 230$q$ and analog-to-digital converters (ADC) 235$i$, 235$q$. The gain of LNA 210 may be programmable by way of a gain control signal 212 to accommodate a range of incoming RF power levels. RF filter 215 may be configured as a bandpass filter having a filter bandwidth and center frequency controlled by a filter control signal 217 provided thereto. The filtered signal may be downconverted by mixers 220$i$, 220$q$ as separate in-phase (I) and quadrature (Q) signals conveyed in corresponding I and Q baseband channels. Filters 225$i$, 225$q$ may be configured as lowpass filters having programmable cutoff frequencies set in accordance with filter control signal 227 to attenuate adjacent frequency channel interferers. These filtered signals are then amplified by channel amplifiers 230$i$, 230$q$ to levels optimized for sampling by baseband ADCs 235$i$, 235$q$. The gain of channel amplifiers 230$i$, 230$q$ may be set by a gain control signal 232. ADCs 235$i$, 235$q$ produce digital I and Q data that may be stored in data memory 240 and conveyed to smartphone 140 through USB interface 260. Baseband processing on the I and Q data may be performed through digital techniques using computational resources on smartphone 140. Such baseband processing may include demodulation and decoding, signal-to-noise measurement, bit-error-rate determination, spectral analysis, etc. Alternatively, an on-board digital signal processor (DSP) 245 to perform such baseband processing, as well as other signal processing.

Detector circuit 200 may include a fixed oscillator 270 that generates a clock signal 272. The clock signal 272 may be provided to a programmable oscillator 275 that generates a tuner oscillator signal 277 having a frequency established by tuner control signal 273. Tuner oscillator signal 277 may be provided to phase splitter 222, which produces quadrature clock signals, i.e., separated in phase by 90 degrees, to mixers 220$i$, 220$q$. Clock signal 272 may also be provided to a clock divider 280 to produce sampling signal 282, the frequency of which dictates the sampling rate of ADCs 235$i$, 235$q$ and 272. Other clock dividers and/or fixed oscillators may be included to generate other clock signals that might be required for circuit operation.

In certain embodiments, detector circuit 200 may include an RF signal detector 270 to obtain a measurement of RF energy in the received signal. For example, RF signal detector 270 may coupled to the output of filter 215 to measure received power within the pass band of filter 215. RF signal detector 270 may generate a voltage at its output proportional to the measured power. When compensated for system constants, such as the gain applied by LNA 210, an estimate of the received power or signal strength at the antenna in the filter passband can be obtained. The output of RF signal detector 270 may also be calibrated and a calibration table may be stored in, for example, system memory 255. The output of signal detector 270 may be converted into a digital quantity by ADC 272, modified as needed for compensation and calibration, buffered in data memory 274 and passed to smartphone 140 via USB interface 260. The measured signal quantity may be used to supplement baseband data in analyzing the nature of the received signal, or may be used as the sole measurement in determining the location of the jamming transmitter.

Detector circuit 200 may include a controller 250 implemented in suitable control circuitry, including microcontrollers and microprocessors. Among other functions, controller 250 may generate tuner control signal 273, LNA gain control signal 212, BP filter control signal 217, LP filter control signal 227 and channel amplifier gain control signal 232 in accordance with control parameters provided to controller 250 from smartphone 140 through USB interface 260. The control parameters may be maintained in system memory 255, where they can be accessed and modified as needed.

Figure 3:
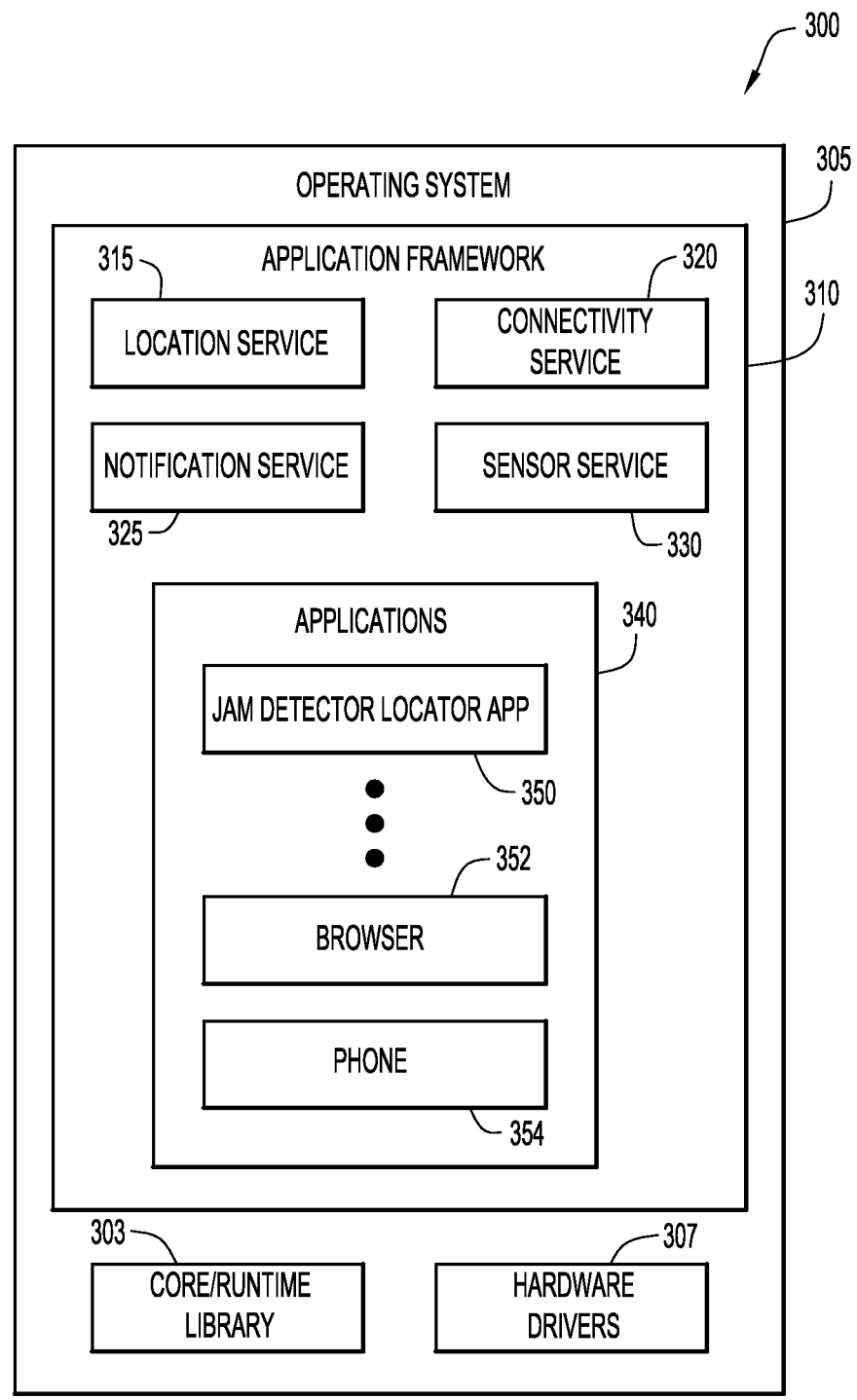
FIG. 3 is a schematic block diagram of a mobile computing application framework that may be used in conjunction with the present general inventive concept.

FIG. 3 illustrates an abstraction of a mobile computing software platform 300 typical for mobile communication devices, such as smartphone 140. Software platform 300 includes an operating system 305 that manages the hardware resources or smartphone 140, such as those illustrated in FIG. 1 and provides common system services. Accordingly, operating system 305 executes hardware drivers 307 that implement a machine abstraction layer, as well as core/runtime libraries 303 that implement a software-accessible interface to low level system functions.

Operating system 305 may support an application framework 310 implementing functional modules that provide services to applications and to other functional modules. The type, number and makeup of the functional modules vary by application framework; modules pertinent to the explanation of the present embodiment are intended to serve as examples of other such modules that are not illustrated and described, but are nevertheless a part of a complete application framework.

Connectivity services module 320 provides services by which applications operating under application framework 310 communicate with external devices and terminals. For example, connectivity services module 320 may implement cellular telephony, WiFi, Bluetooth and USB interfaces through which information-bearing data and control information are communicated over a corresponding communication channel.

Notification services module 325 implements control over notifications, e.g., alerts that may be issued to a user, such as through a buzzer, special ringtone, and/or visual indicator included in a user interface.

Sensor services module 330 provide access to various motion, environmental and position sensors on smartphone 140, such as those enumerated above. Sensor services module 325 may provide raw sensor data, such as three-dimensional coordinates in a known sensor coordinate system.

Location services module 315 implements functionality by which an application is made location-aware, i.e., is able to identify its geographical location. Such location may be ascertained by more than one technique, GPS and network location provision being apt examples. GPS is typically most accurate, but works only outdoors, quickly consumes battery power, and can be slower than other techniques. A network location provider determines user location using cell tower and Wi-Fi signals, providing location information in a way that works indoors and outdoors, that is more rapidly responsive, and that consumes less battery power. Location services module 315 may determine a position from one of several techniques, depending on the particular location update strategy and cache location data for use by location-aware applications between updates. The cased location can be retrieved as the most recent known position in the event that GPS jamming is encountered, in which case, GPS data becomes unreliable. The present invention is not limited to a particular location service, but may utilize any platform-dependent features of the embodying hardware and software platforms in accordance with the availability of such in embodiments of the present invention.

Application framework 310 supports various end-user applications 340 with services, such as those described above. Certain applications 310 are well known and are typically implemented across platforms, such as phone application 354, by which a user conducts cell phone calls and web browser application 352. JLS application 350, in the present embodiment, implements features of the present invention as described below, and executes at this application hierarchical level. In one embodiment, JLS application 350 may implement a software-defined radio (SDR) receiver operating on I and Q data produced by ADCs 235$i$, 235$q$. Accordingly, JLS 100 can receive and process signals of vastly different radio communication protocols, which can aid in jamming signal analysis. However, it is to be understood that JLS application 350 can be implemented to perform a variety of forensic analyses, depending on the resources available in both detector circuit 200 and smartphone 140.

Figure 4:
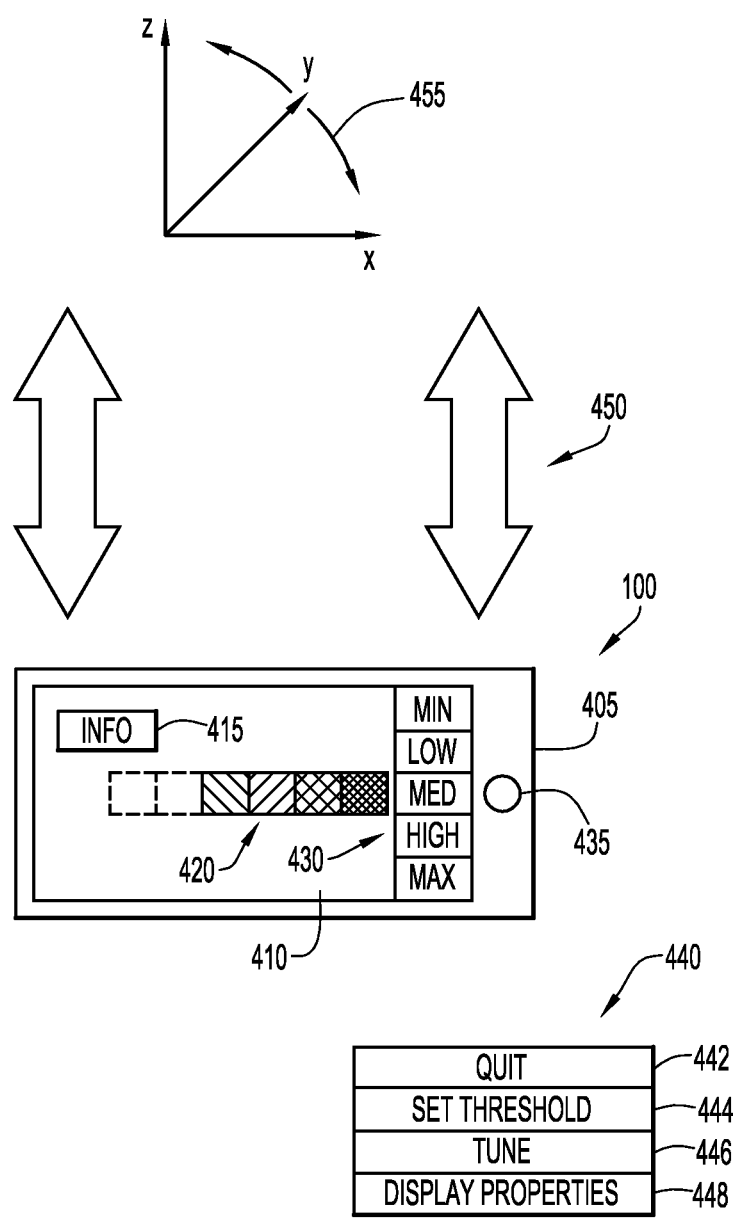
FIG. 4 is a block diagram depicting operation of a jammer location system by which the present general inventive concept may be embodied.

FIG. 4 is a diagram of JLS 100 in an operational configuration. A user interface generally illustrated at user interface 405 includes a display control 410 to display output information and, optionally, when implemented in touch-screen hardware, to accept input from a user. Display control 410 may be configured and operated through services of application framework 110 to realize a signal strength indicator control 420, gain control 430 and information panel 415. User interface 405 may additionally include a menu button 435, which, when activated, compels a menu interface 440 to be displayed in display control 410 (illustrated aside for purposes of clarity). Menu interface 440 may include controls that afford system configuration and software control. For example, the display properties control 448 allows the user to change the visual characteristics of display control 410, such as color scheme and data format. Quit control 442 terminates JLS application 350.

Set threshold control 444 establishes a signal strength or received power threshold for purposes of user notification. For example, depending on known or estimated GPS signal levels at the current location of JLS 100, the user may set a threshold level that would indicate a possible interference event worthy of being investigated. To do so, the user would activate set threshold control 444, which may instantiate a user input control (not illustrated) that would accept user input of a threshold level. The entered threshold level may be associated with an alert provided through notification services 325. Accordingly, when the threshold is crossed, an alarm or other notification mechanism may be issued to prompt the user to begin an investigation as to the source of the increased received signal level. The crossing of the threshold may trigger other events as well, such as to initiate data logging. As such, the user may adjust the threshold level during an investigation so as to control the data being logged.

Tune control 446 configures detector circuit 200 for reception of signals on a specific carrier frequency. Activation of tune control 446 may instantiate a frequency selection control (not illustrated) by which a carrier frequency may be entered. In certain embodiments, such frequency selection control may present a fixed number of carrier frequencies from which to chose, e.g., L1 or L2, and restriction to a single selection may be enforced through the software. Upon such selection, a suitably constructed command signal may convey the selected frequency through the USB to controller 250 in detection circuit 200. In response, controller 250 may generate an appropriate tuner control signal 273 to compel programmable oscillator 275 to generate the selected carrier frequency. Additionally, controller 250 may generate an appropriate BP filter control signal 217 that configures programmable filter 215 as a bandpass filter centered on the carrier frequency. Controller 250 may fine tune other components in accordance with the selected frequency as well, such as to the cutoff frequencies in lowpass filters 225$i$, 225$q$ and the channel gain in amplifiers 230$i$, 230$q$.

Gain control 430 may be implemented as several pressure responsive fields in display control 410. When so embodied, a user can make gain adjustments to LNA 210 by selecting a particular gain level from those presented in display control 410. In response to a selection, a suitable command signal may be conveyed over the USB that indicates the selected gain level to controller 250. Controller 250 may in turn generate an appropriate LNA gain control signal 212 that adjusts the gain in LNA 210 accordingly. Again, controller 250 may fine tune other components in accordance with the selected gain setting.

To conduct a jamming source location investigation, exemplary JLS 100 is held in one or both hands of a user (not illustrated) to align the boresight of antenna 205 in a given direction. In the currently described embodiment, indicators 450 indicate the orientation of an antenna array. The boresight of this array is normal to the drawing sheet containing FIG. 4, i.e., lying in the x-y plane. In a given boresight orientation, signal strength indicator control 420 will provide an indication of the strength or power level of the RF signal intercepted by the effective antenna aperture in the direction of the boresight. As the boresight is rotated in the x-y plane, as illustrated by arc 455 in FIG. 4, a new signal strength measurement is obtained, the result of which is reflected through an update of signal strength indicator control 420. The boresight direction may be displayed in information panel 415. Signal strength indicator control 420 may be implemented as a bar graph that illuminates an increasing number of bar elements as signal strength increases and extinguishes an increasing number of bar elements as signal strength decreases. The jammer location investigation thus proceeds through visual feedback—rotating JLS 100 and monitoring the change in signal strength through signal strength indicator control 420. The location of the jammer can be inferred from the boresight direction in which the maximum signal strength is indicated. Gain adjustments may be made throughout the foregoing procedure, either by automatic gain control, through gain control 430, or both, so as to maintain a level of sensitivity in the signal strength measurement that can be visually discerned through signal strength indicator control 420. That is, if signal indicator is at or near full scale, or at or near zero, the user may not discern any change in signal strength as JLS 100 is rotated, even in the presence of a jamming transmitter. Gain adjustments can be made as needed to maximize sensitivity of the response in signal strength indicator control 420 to changes in spatial orientation of LJS 100.

In certain embodiments, data are logged as the jamming location investigation proceeds. As indicated above, logging may be initiated automatically in response to signal strength threshold being exceeded. Data logging may continue as a background process, storing a multi-valued data record at a prescribed recording rate, which may be a user-configurable parameter. In certain embodiments, the data records comprises data indicative of the time of measurement, the received signal strength, the geographical location and orientation in space of JLS 100 and other data that may be deemed appropriate, such as environmental conditions. As discussed above, the geographical location can be obtained through location services module 315 and the orientation in space can be obtained through sensor services module 330. Accordingly, the data log contains a time series (or scanning direction series) of data records each indicating a signal strength measurement, a compass heading in which, and a geographic coordinate at which the signal strength measurement was made. As will be described below, such data logs from multiple deployed JLSs can be aggregated and correlated to provide a signal strength map of a region of interest.

In certain embodiments, the operational state of JLS 100 can be set by its orientation in space. For example, when the JLS 100 is oriented in a position that is not used for jamming location, such as when the boresight is pointed outside a specific angle from parallel to the ground, as would be determined from orientation sensors on smartphone 140, certain system functions can be deactivated. As one example, data logging and/or data transmission may be inhibited when the JLS is not in a data collection orientation. Data logging options are discussed further below.

Figure 5:
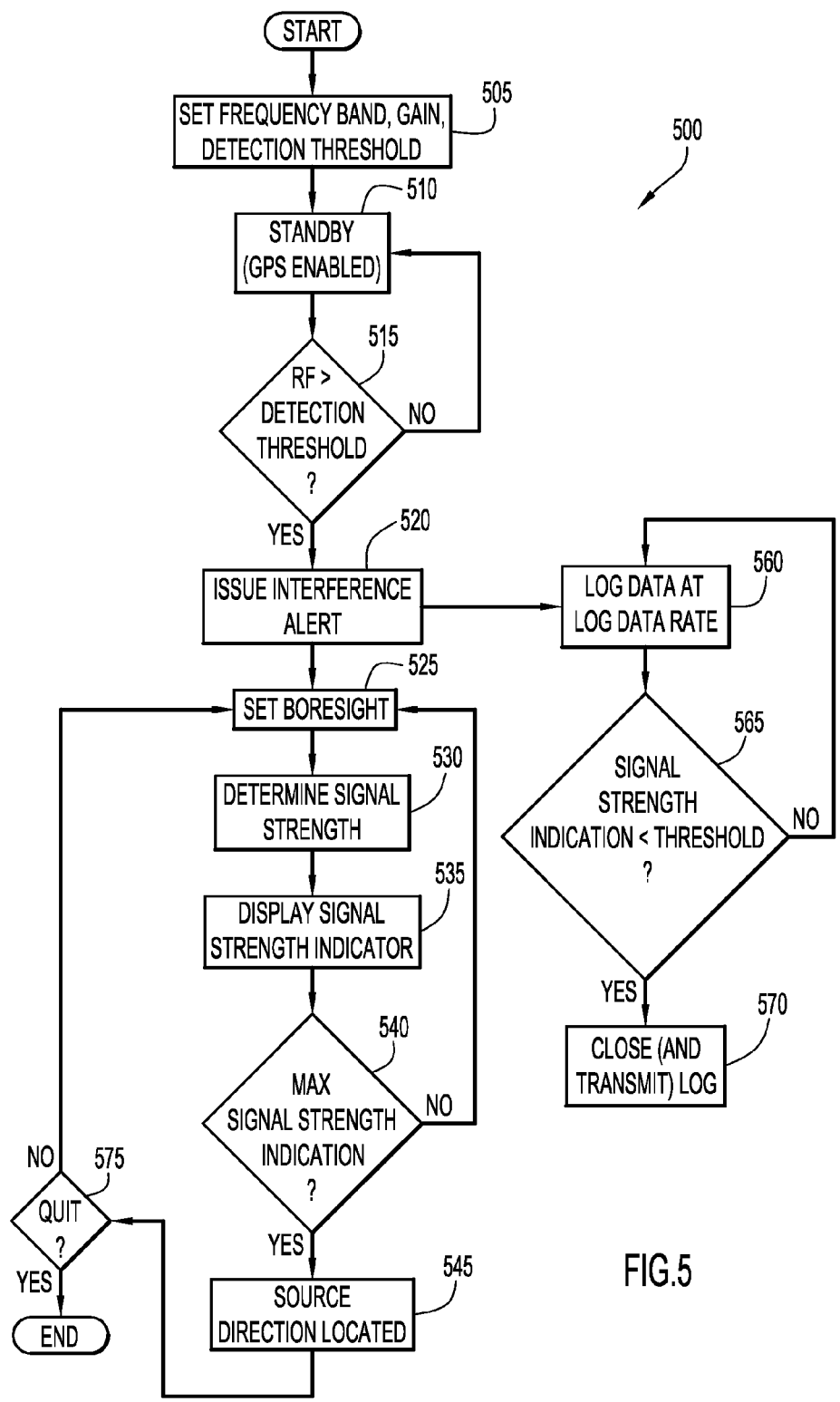
FIG. 5 is a flow diagram of a jammer location process by which the present general inventive concept may be embodied.

FIG. 5 is a flow diagram of an exemplary jammer location process that may be performed through embodiments of the present invention. In operation 505, a user selects a frequency band, gain and detection threshold through the corresponding controls of JLS 100. JLS 100 enters a standby state in operation 510, in which the GPS receiver 144 of smartphone 140 is enabled. While in standby mode, location services module 315 maintains a cached data record indicative of the geographical location of JLS 100, as described above. In operation 515, a measurement of GPS signal strength obtained from detector circuit 200 and, if the measurement is below the established threshold, JLS 100 is maintained in the standby state. If, however, the measured GPS signal strength exceeds the threshold, notification services module 325 issues an alert in operation 520. In operation 525, the boresight of directional antenna 205 is aligned in a direction chosen by the operator, and a signal strength measurement is taken in operation 530. In operation 535, an indication of the measured signal is provided to the user, such as through signal strength indicator control 420. In operation 540, the user determines whether the current signal strength indication is greater than that for any previous measurements and, if not, JLS 100 can be rotated to align the boresight of antenna 205 in a new direction in operation 525. If signal strength indication is maximum in the current boresight direction, the direction to jamming source is inferred to be in that direction in operation 545. In operation 575, it is determined whether the user wishes to terminate the investigation. If further investigation is desired, such as to continue monitoring the signal strength as the user moves towards the inferred jammer location, process 500 continues at operation 525.

As stated above, the issuance of the alert in operation 520 may initiate a data logging session, as indicated at operation 560. Data are recorded in, for example, a data log file in memory 165, at a predetermined data logging rate until, in operation 565, it is determined that the signal strength falls below the threshold. The data log file is then closed in operation 570 and, in certain embodiments, is transmitted to a remote location for analysis, as described below.

Figure 6:
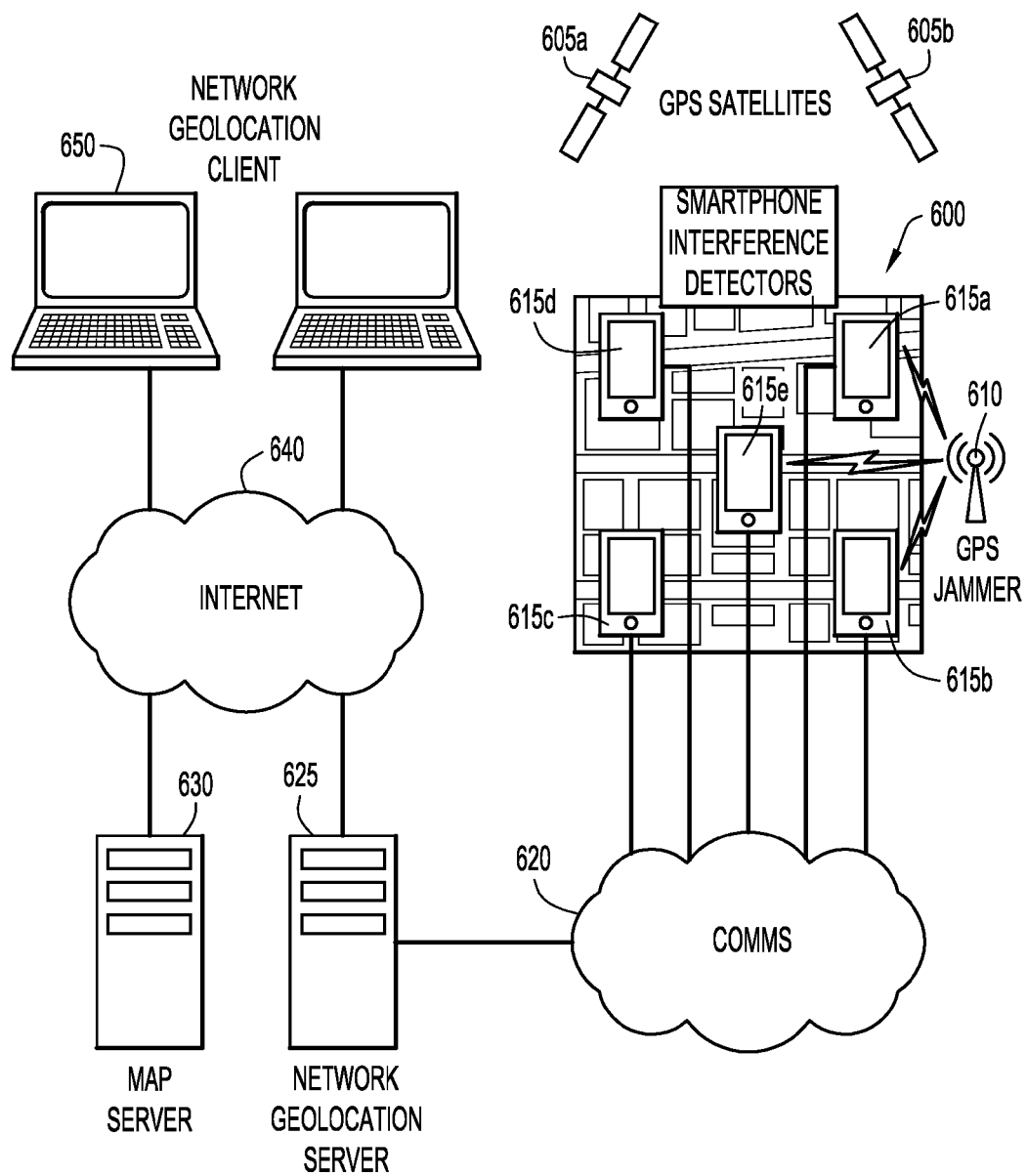
FIG. 6 is a block diagram of a network geo-location system by which jammer location data are further processed by embodiments of the present general inventive concept.

FIG. 6 is a diagram of a network geo-location system by which data from spatially-distributed and autonomously operated JLSs 615a-615e, representatively referred to herein as JLS(s) 615, are analyzed to locate a GPS jammer 610. It is to be assumed for purposes of explanation that JLSs 615 are distributed in a coverage region 600 of both GPS satellites 605a,605b and one or more communication networks, representatively illustrated by communication network 620. Communication network 620 may be wireless communication infrastructure accessible through the services of one or more competing service providers, each operating under possibly different communication standards. Accordingly, each JLS 615 may comprise a smartphone 140 that is configured to communicate over a particular service provider's air channels that may, or may not the same as other JLS 615 in region 600.

At some point in time, one or more JLS 615 is alerted to the presence of jammer 610, such as by an issued alert described above. In response, operators of the JLSs 615 will initiate an investigation by scanning the region, as described above. During this time, data records containing for example, sampling time, signal strength, compass heading of the scan direction and geographical location, among other possible data, are logged in a manner described above.

Each JLS 615 may initiate and maintain a communication session with network geo-location server 625, such as, for example, a suitably constructed Transport Control Protocol/Internet Protocol (TCP/IP) session, although the present invention is not so limited. Each JLS 615 may upload its logged data to network geo-location server 625 where it may be stored in suitable data structures in server storage, e.g., disk drives.

Once sufficient data have been aggregated from JLSs 615, network geo-location server 625 can correlate the data in space and time and compute therefrom a common data set from which the location of GPS jammer 610 can be identified. Such a data set may be, for example, a set of vectors defining a compass heading on which maximum signal strength was measured from the location of the JLS 615 that took the measurement for that vector. The set of vectors may thus be directed to a common geographical coordinate that can be ascertained through a suitable technique, such as triangulation. Information regarding that geographical coordinate can be sought from, for example, map server 630, which may identify a nearest street address or other identifying information. Operators of a network geo-location system terminal 650 can then dispatch or otherwise direct applicable personal, e.g., law enforcement officials, to the address for further investigation and neutralization of jammer 610.

In certain embodiments, a mark bearing function provides the user with manual control of the data logging feature to simplify forensic analysis. For example, a user can manually identify when JLS 100 is pointing in the direction of peak interference signal. Additionally, the user may manually command uploading log data to a local log file and the network geo-location server 625, and tag the data with a unique identifier. To ensure integrity of data transmitted to the network geo-location server 625 when automatically logging signal data, i.e., in response to an alert, JLS 100 will log all data that is higher than the user-defined threshold to the local log file, but will only transmit data to network geo-location server 625 when it is determined that JLS 100 is in the vertical, scanning orientation (based on sensor data from smartphone 140).

Figure 7A:
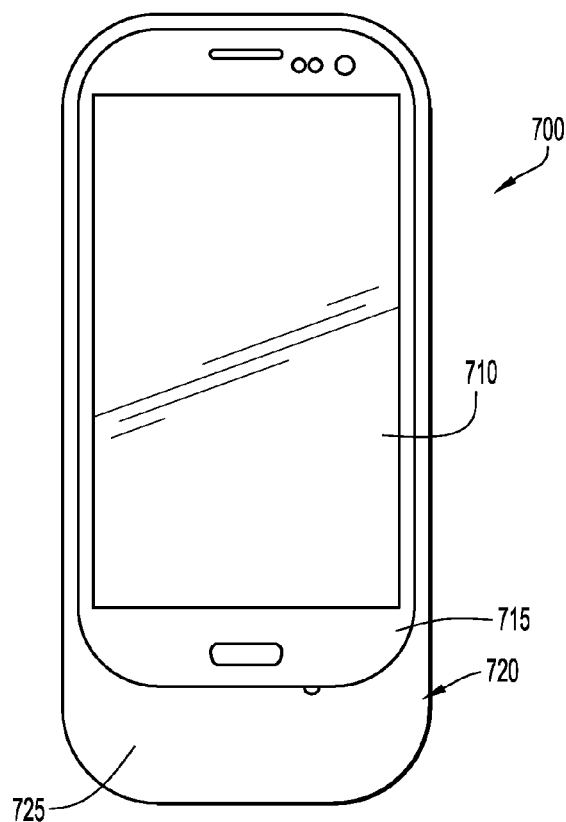
FIGS. 7A-7C are illustrations of mechanical and electrical components of an embodiment of the present general inventive concept.
Figure 7B:
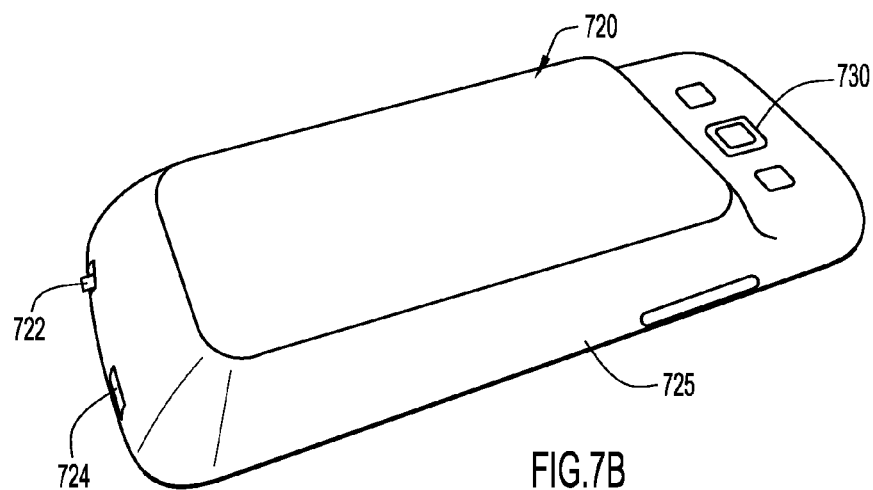

FIG. 7A-7B are illustrations of a JLS 700 that is functionally equivalent to JLS 100, but where the form factor of the device is mechanically defined. JLS 700 includes a smartphone 710, which is self-contained in its own housing 715. JLS 700 also includes a detection/location adapter, or simply adapter 720, which is contained in its own housing 725. Housing 725 is attached to housing 715 in a suitable manner, which will vary by make and model of smartphone 710. In certain embodiments, housing 725 is selectively attachable allowing the cases to be mechanically coupled and separated at the will, and only at the will of a user. Housing 725 may be formed of a suitable material taking into consideration necessary mechanical considerations and electromagnetic transparency at GPS frequencies. Housing 725 may include a number of openings 730 befitting the make and model of smartphone 710, such as for a camera aperture, user controls, etc. Additionally, housing 725 may include an opening through which adapter power switch 722 extends, as well as for a USB connector 724.

Figure 7C:
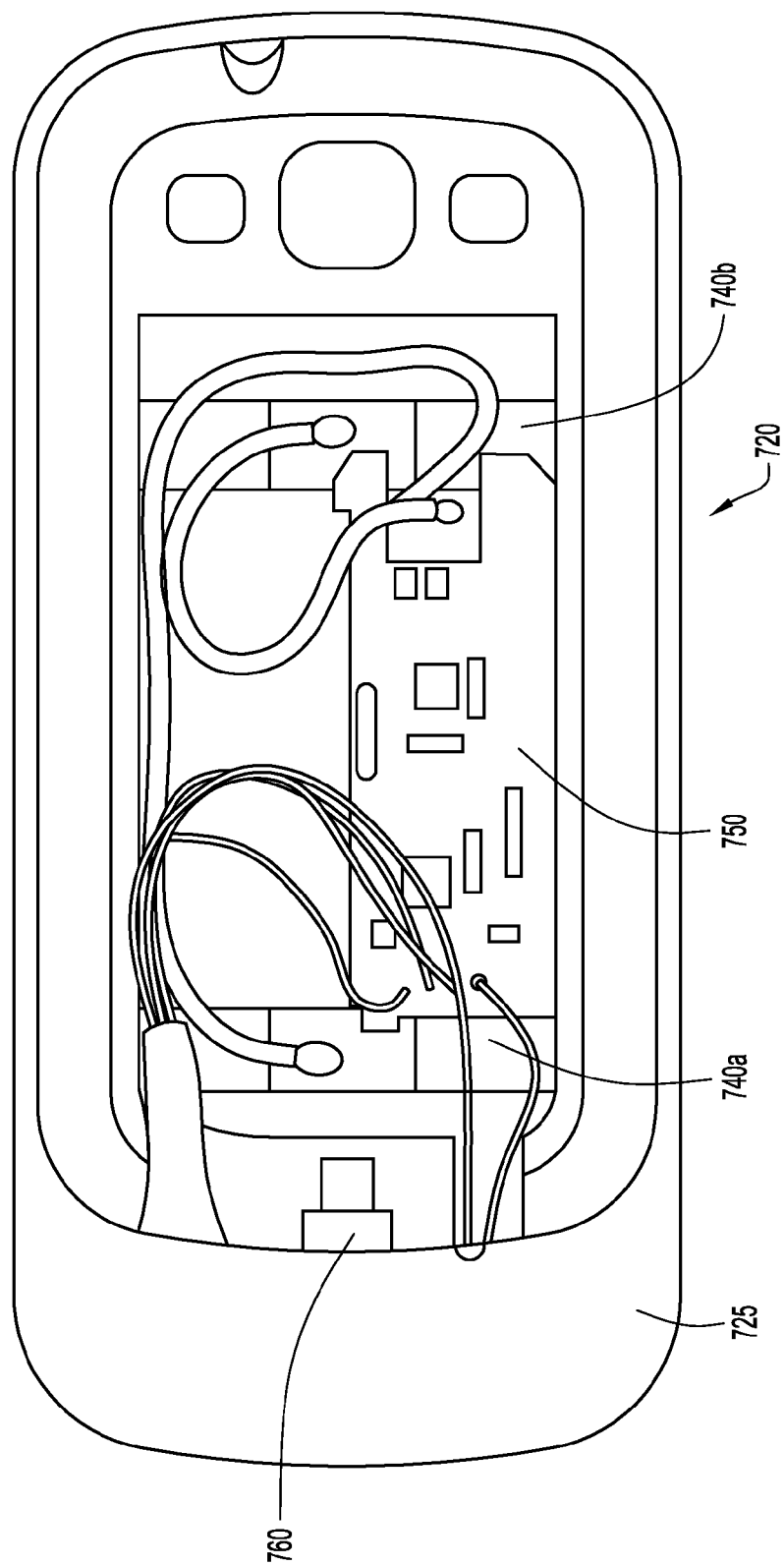

FIG. 7C is an illustration of the interior of housing 725. Antenna elements 740*a*, 740*b*, collectively referred to as antenna 740, is positioned against the rear wall of housing 725 in a fixed arrangement that establishes the directivity and, therewith, the antenna's boresight. The present invention is not limited to particular materials from which antenna 740 is constructed; continued improvement in antenna design may allow smaller, higher gain antennas for small form factor radio direction finding implemented in embodiments of the present invention.

Antenna elements 740*a*, 740*b* are coupled via suitable transmission lines to circuit board 750, on which circuitry for adapter 720 is contained. An internal USB connector 760 is also electrically connected to circuit board 750 to form the USB signal paths between smartphone 710 and adapter 720.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
    a detector circuit comprising:
        a directional antenna defining a boresight along which electromagnetic radiation is preferentially accepted; and
        a signal detector coupled to the antenna to generate an electrical signal from a selected radio-frequency (RF) spectral band of the electromagnetic radiation accepted by the antenna;
    a processor configured to:
        determine a direction in which the boresight is aligned;
        generate radio direction data including an indication of a signal characteristic of the electrical signal at a signal sample time and the direction of the boresight at the signal sample time; and
        present the data indicative of the signal characteristic in humanly-perceivable form in substantial concurrency with the signal sample time; and
    a mobile platform mechanically affixed to the detector circuit and being selectively connectable to and separable from the processor such that the detector circuit and the processor, when connected, are freely oriented in space in fixed mechanical formation by a single human operator.

2. The apparatus of claim 1 further comprising an orientation sensor to generate a signal indicative of an orientation in space of the mobile platform, and wherein the processor is further configured to determine the direction of the boresight from the orientation signal at the sample time.

3. The apparatus of claim 1, wherein the processor is further configured to:
    determine a geographical location of the mobile platform; and
    include an indication of the geographical location of the mobile platform at the sample time in the radio direction data.

4. The apparatus of claim 3 further comprising a satellite navigation system receiver communicatively coupled to the processor and providing a signal thereto indicative of a geographic location thereof; and wherein the processor is further configured to determine the geographical location of the mobile platform from the satellite navigation signal.

5. The apparatus of claim 4 further comprising a wireless communication transceiver to obtain a geographical location thereof from a location service provider through a wireless communication data exchange; and wherein the processor is further configured to:
    store a current location of the mobile platform as the most recent of the geographical location indicated in the satellite navigation signal or the geographical location obtained from the location service provider; and
    determine the geographical location of the mobile platform from the current location of the mobile platform in storage at the sample time.

6. The apparatus of claim 3, wherein the processor is further configured to:
    monitor a level of the electromagnetic radiation in the selected RF spectral band; and
    issue an alert upon the level of the electromagnetic radiation exceeding a user-defined threshold.

7. The apparatus of claim 6, wherein the processor is further configured to:
    generate a numerical value of a signal level of the electromagnetic radiation as the indication of the signal characteristic; and
    store the radio direction data for each of sequential log times occurring at a data logging rate while the level of the electromagnetic radiation is above the threshold and until the level of the electromagnetic radiation falls below the threshold.

8. The apparatus of claim 7 further comprising:
    a wireless communication transceiver mechanically integrated with the processor on the mobile platform and electrically coupled therewith; and
    a network geo-location server to determine a geographical location of a transmitter from the radio direction data obtained from multiple locations; and wherein the processor is configured to transmit the stored radio direction data to the network geo-location server.

9. The apparatus of claim 8, wherein the network geo-location server is configured to:
    compute a set of vectors from the radio direction data obtain from the respective multiple locations, each of the vectors having a direction corresponding to the boresight direction at which the signal level of the electromagnetic radiation is maximum in the radio direction data for the corresponding one of the multiple locations and a source location corresponding to the geographical location of the corresponding mobile platform; and
    identify the geographical location of the transmitter from an intersection of determined.

10. The apparatus of claim 1, wherein the signal detector comprises:
    an amplifier to amplify signals in the accepted electromagnetic radiation in accordance with a variable gain control signal;
    a bandpass filter to filter the amplified signals through a passband defined over the selected RF spectral band in accordance with a filter control signal; and
    a signal converter to generate the electrical signal from the filtered signals.

11. The apparatus of claim 10, wherein the signal converter comprises a signal level detector electrically coupled to the bandpass filter to generate the electrical signal to represent a signal level of the filtered signals; and wherein the processor is further configured to generate a numerical value of the signal level as the indication of the signal characteristic.

12. The apparatus of claim 10, wherein the signal converter comprises an RF downconverter to downconvert the filtered signals from a selected carrier frequency to a baseband frequency, the electrical signal comprising a baseband signal carried on the carrier frequency; and the processor is further configured to:
   determine a signal level of the baseband signal; and
   generate a numerical value of the signal level as the indication of the signal characteristic.

13. The apparatus of claim 12, wherein the downconverter comprises:
   a programmable oscillator to generate an oscillator signal at the selected carrier frequency in accordance with a tuner control signal; and
   a frequency mixing circuit to mix the oscillator signal with the filtered signals to produce the baseband signal.

14. The apparatus of claim 13, wherein the processor is further configured to:
   accept user input selecting the carrier frequency;
   generate the tuner control signal to compel the programmable oscillator to generate the oscillator signal at the selected carrier frequency; and
   generate the filter control signal to define a center frequency of the passband as the carrier frequency.

15. An apparatus comprising:
   a detector circuit comprising:
      a detector circuit housing;
      a directional antenna in the detector circuit housing defining a boresight along which electromagnetic radiation is preferentially accepted; and
      a signal detector in the detector circuit housing and coupled to the antenna to generate an electrical signal from a selected radio-frequency (RF) spectral band of the electromagnetic radiation accepted by the antenna;
   a mobile communication device comprising:
      a mobile device housing; and
      a processor in the mobile device housing and configured to:
         determine a direction in which the boresight is aligned;
         generate radio direction data including an indication of a signal characteristic of the electrical signal at a signal sample time and the direction of the boresight at the signal sample time; and
         present the data indicative of the signal characteristic in humanly-perceivable form in substantial concurrency with the signal sample time;
   a signal bus communicatively coupling the detector circuit and the mobile communication device; and
   a connection interface mechanically affixed to the detector circuit and being selectively connectable to and separable from the mobile communication device such that the detector circuit and the mobile communication device, when connected, are freely oriented in space in fixed mechanical formation by a single human operator.

16. The apparatus of claim 15, wherein the processor in the mobile communication device is further configured to:
   determine a geographical location of the mobile communication device; and
   include an indication of the geographical location of the communication device at the sample time in the radio direction data.

17. The apparatus of claim 16, wherein the processor in the mobile communication device is further configured to:
   monitor a level of the electromagnetic radiation in the selected RF spectral band; and
   issue an alert upon the level of the electromagnetic radiation exceeding a user-defined threshold.

18. The apparatus of claim 17, wherein the processor in the mobile communication device is further configured to:
   generate a numerical value of a signal level of the electromagnetic radiation as the indication of the signal characteristic; and
   store the radio direction data for each of sequential log times occurring at a data logging rate while the level of the electromagnetic radiation is above the threshold and until the level of the electromagnetic radiation falls below the threshold.

19. The apparatus of claim 18 further comprising:
   a wireless communication transceiver in the mobile communication device housing and electrically coupled to the processor; and
   a network geo-location server to determine a geographical location of a transmitter from the radio direction data obtained from multiple locations; and wherein the processor in the mobile communication device is configured to transmit the stored radio direction data to the network geo-location server.

20. The apparatus of claim 19, wherein the network geo-location server is configured to:
   compute a set of vectors from the radio direction data obtain from the respective multiple locations, each of the vectors having a direction corresponding to the boresight direction at which the signal level of the electromagnetic radiation is maximum in the radio direction data for the corresponding one of the multiple locations and a source location corresponding to the geographical location of the corresponding mobile platform; and
   identify the geographical location of the transmitter from an intersection of the computed vectors.

21. A tangible, non-transient computer-readable medium encoded with processor instructions that, when executed by a processor, configure the processor to:
   determine a direction in which a boresight of a directional antenna is aligned from sensors mechanically coupled to the antenna, the processor and a display in fixed mechanical formation so as to be freely oriented in space in the fixed mechanical formation by a single human operator;
   accept an electrical signal from a signal detector coupled to the antenna that is indicative of electromagnetic radiation in a selected radio-frequency (RF) spectral band intercepted by the antenna in the direction of the boresight;
   generate radio direction data including an indication of a signal characteristic of the electrical signal at a signal sample time and the direction of the boresight at the signal sample time; and
   present the data indicative of the signal characteristic on the display in substantial concurrency with the signal sample time.

22. A method comprising:
   determining a direction in which a boresight of a directional antenna is aligned as the antenna, a processor and a display are rotated in fixed mechanical formation by a single human operator;

generating an electrical signal that is indicative of electromagnetic radiation in a selected radio-frequency (RF) spectral band intercepted by the antenna in the direction of the boresight;

generating, by the processor, radio direction data including an indication of a signal characteristic of the electrical signal at a signal sample time and the direction of the boresight at the signal sample time; and presenting, on the display, the data indicative of the signal characteristic in substantial concurrency with the signal sample time.

\* \* \* \* \*